US009674729B2

(12) United States Patent
Ketheesan et al.

(10) Patent No.: US 9,674,729 B2
(45) Date of Patent: *Jun. 6, 2017

(54) CHANNEL BANDWIDTH ESTIMATION ON HYBRID TECHNOLOGY WIRELESS LINKS

(71) Applicant: Venturi Wireless, Inc., San Jose, CA (US)

(72) Inventors: Kanapathipillai Ketheesan, San Francisco, CA (US); David Choi, Cupertino, CA (US)

(73) Assignee: Venturi Wireless, Inc., San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/594,027

(22) Filed: Jan. 9, 2015

(65) Prior Publication Data

US 2015/0124603 A1 May 7, 2015

Related U.S. Application Data

(63) Continuation of application No. 13/345,550, filed on Jan. 6, 2012, now Pat. No. 8,937,877, which is a
(Continued)

(51) Int. Cl.
*H04L 12/26* (2006.01)
*H04W 28/02* (2009.01)
*H04W 24/08* (2009.01)

(52) U.S. Cl.
CPC ..... *H04W 28/0268* (2013.01); *H04L 43/0858* (2013.01); *H04L 43/0882* (2013.01); *H04L 43/106* (2013.01); *H04W 24/08* (2013.01)

(58) Field of Classification Search
CPC H04L 43/0858; H04L 43/0882; H04L 43/106
See application file for complete search history.

(56) References Cited

U.S. PATENT DOCUMENTS

| 5,359,593 | A | 10/1994 | Derby et al. |
| 5,477,531 | A | 12/1995 | McKee et al. |

(Continued)

FOREIGN PATENT DOCUMENTS

| EP | 814584 A2 | 12/1997 |
| EP | 814585 A2 | 12/1997 |

(Continued)

OTHER PUBLICATIONS

"Fast End-to-End Available Bandwidth Estimation for Real-Time Multimedia Networking," Jul. 2006, ZDNet, National Chiao Tung University, Retrieved Online Sep. 5, 2008 from http:whitepapers.zdnet.com/abstract.aspx?docid+296976.

(Continued)

*Primary Examiner* — Luat Phung
(74) *Attorney, Agent, or Firm* — KPPB LLP

(57) ABSTRACT

A bandwidth estimation algorithm on shared links detects peaks and/or average per-user bandwidth. Estimating is performed at the transport or IP layer with no assistance from lower layer (PHY, MAC, etc.) and the techniques can be used for any of adjusting the level of video optimization to the available bandwidth; driving QoS decisions at the transmitter based on available bandwidth; improving QoS enforcement during transitions among hybrid technologies on a wireless links; and correcting estimates on devices delivering bursty payload.

16 Claims, 3 Drawing Sheets

Related U.S. Application Data continuation of application No. 12/581,018, filed on Oct. 16, 2009, now Pat. No. 8,116,225.

(60) Provisional application No. 61/110,257, filed on Oct. 31, 2008.

(56) References Cited

U.S. PATENT DOCUMENTS

| | | | |
|---|---|---|---|
| 5,815,492 | A | 9/1998 | Berthaud et al. |
| 6,011,776 | A | 1/2000 | Berthaud et al. |
| 6,393,480 | B1 | 5/2002 | Qin et al. |
| 6,657,964 | B1 | 12/2003 | Kohzuki et al. |
| 6,687,224 | B1 | 2/2004 | Ater et al. |
| 6,839,767 | B1 | 1/2005 | Davies |
| 7,072,295 | B1 | 7/2006 | Benson |
| 7,359,985 | B2 | 4/2008 | Grove |
| 8,937,877 | B2 | 1/2015 | Ketheesan et al. |
| 2002/0015477 | A1 | 2/2002 | Geile |
| 2002/0099842 | A1 | 7/2002 | Jennings et al. |
| 2002/0124096 | A1 | 9/2002 | Loguinov et al. |
| 2002/0169880 | A1* | 11/2002 | Loguinov ........... H04L 12/2697 709/228 |
| 2003/0142651 | A1 | 7/2003 | Matta |
| 2003/0179769 | A1 | 9/2003 | Shi et al. |
| 2004/0100982 | A1 | 5/2004 | Balasubramanian |
| 2004/0236863 | A1 | 11/2004 | Shen et al. |
| 2005/0163059 | A1 | 7/2005 | Dacosta |
| 2005/0213586 | A1 | 9/2005 | Cyganski et al. |
| 2005/0228896 | A1 | 10/2005 | Nishida |
| 2006/0095944 | A1 | 5/2006 | Demircin |
| 2006/0209838 | A1* | 9/2006 | Jung ................. H04L 43/0894 370/394 |
| 2006/0215574 | A1 | 9/2006 | Padmanabhan |
| 2006/0253546 | A1 | 11/2006 | Chang et al. |
| 2007/0070896 | A1* | 3/2007 | Alapuranen ........ H04L 12/5692 370/230 |
| 2007/0223529 | A1 | 9/2007 | Lee et al. |
| 2007/0254612 | A1 | 11/2007 | Simmons |
| 2008/0101233 | A1* | 5/2008 | Shi ........................ G06F 9/505 370/235 |
| 2008/0181125 | A1 | 7/2008 | Imai |
| 2008/0267065 | A1 | 10/2008 | Balakrishnan et al. |

FOREIGN PATENT DOCUMENTS

| | | |
|---|---|---|
| EP | 643514 B1 | 3/2003 |
| EP | 867101 B1 | 11/2004 |
| EP | 817433 B1 | 9/2006 |
| EP | 1417808 B1 | 1/2007 |
| WO | 9222967 A1 | 12/1992 |
| WO | 9837708 A2 | 8/1998 |
| WO | 0120876 A1 | 3/2001 |
| WO | 2004017645 A2 | 2/2004 |
| WO | 2006056880 A2 | 6/2006 |
| WO | 2006088595 A2 | 8/2006 |
| WO | 2006098825 A2 | 9/2006 |
| WO | 2006119465 A2 | 11/2006 |

OTHER PUBLICATIONS

Citeseer Search Google Search performed on Sep. 5, 2008 on citeseer.ist.psu.edu, Bandwidth and Packet and Burst and TCP/IP, http:www.google.com/search?num50&hl=en&qsite:citeseer.ist.psu.edu+bandwidth+and+packet+and+burst+and+tcp/ip&start=50&sa=N.

Citeseer Search: Google Search Performed on Sep. 5, 2008 on citeseer.ist.psu, Bandwidth and Packet and Burst and TCP/IP, http://www.google.com/search?num=50&hl=en&q=site3Aciteseer.ist.psu.edu+bandwidth+and+packet+and+burst+and+tcp%2Fip&btnG=Search.

Google Results: Dynamic Bandwidth Estimation, Search Performed on Sep. 5, 2008, http://google.com/search?=dynamic%20bandwidth%20estimation.

TechRepublic, "Bandwidth Estimation Resourses," Aug. 1, 2001-Jun. 1, 2008, Copyright 2008, Retrieved Online on Sep. 5, 2008 from http://search.techrepublic.com.com/search/bandwidth+estimation.html.

University of California, "Streaming Media Congestion Control Using Bandwidth Estimation," Jul. 17, 2002, ZDNet.co.uk, Retrieved Online Sep. 5, 2008 from http://whitepapers.zdnet.co.uk/0,1000000651,260454426,00.htm.

Aracil, J. et al., "A-Priori Flow Bandwidth Estimates for Dynamic Bandwidth Allocations in ISP Access Links," Apr. 2001, Proc. of the ITC Specialists Seminar on Access Networks and Systems, 2001, Gerona, Spain, pp. 161-167.

Martinez, J. L., "Qos Estimators for Client Side Dynamic Server Selection: Limitations and Keys," Jun. 28-Jul. 1, 2004, Proc. ISCC 2004, Nineth International Symposium on Computers and Communications (IEEE Cat. No. 04TH8769), vol. 2, pp. 933-938.

Parvez, N. et al., "TCP Prairie: A Sender-Only TCP Modification Based on Adaptive Bandwidth Estimation in Wired-Wireless Networks," Feb. 2005, Computer Communications, ISSN 0140-3664, vol. 28, No. 2, pp. 246-256, Retrieved Online on Sep. 5, 2008 from http://cat.inis.

Sarr, C. et al., "Bandwidth Estimation for IEEE 802.11-Based Ad Hoc Networks," IEEE Transactions on Mobile Computing, Oct. 2008, vol. 7, No. 10, pp. 1228-1241, Retrieved Online Sep. 5, 2009 from http:csdl1.computer.org/persagen/DLabsToc.jsp?resourcePath=/dl/trans/t.

Shah, S. H., "Available Bandwidth Estimation in IEEE 802.11-Based Wireless Networks," 2003, Department of Computer Science, University of Illinois at Urbana-Champaign.

Shah, S. H., "Dynamic Bandwidth Management in Single-Hop Ad Hoc Wireless Networks," Feb. 2005, Mobile Networks and Applications, vol. 20, No. 1-2, pp. 199-217, Springer, Netherlands, ISSN 1383-469X (print) 1572-8153 (online), Retrieved online Sep. 5, 2008 from http:www.springerlink.com/content/9dc8915deb152a17.

* cited by examiner

CHANNEL BANDWIDTH ESTIMATION ON HYBRID TECHNOLOGY WIRELESS LINKS

CROSS REFERENCE TO RELATED APPLICATIONS

The present application is a continuation of U.S. patent application Ser. No. 13/345,550, entitled "Channel Bandwidth Estimation on Hybrid Technology Wireless Links," filed Jan. 6, 2012, which application is a continuation of U.S. patent application Ser. No. 12/581,018, entitled "Method and Apparatus for Estimating Channel Bandwidth," filed Oct. 16, 2009, which application claims priority under 35 U.S.C. 119(e) to U.S. Provisional Application Ser. No. 61/110,257, entitled "Method of Estimating Channel Bandwidth," filed Oct. 31, 2008. The disclosures of U.S. patent application Ser. No. 13/345,550, U.S. patent application Ser. No. 12/581,018, and U.S. Provisional Application Ser. No. 61/110,257 are incorporated herein by reference in their entirety.

BACKGROUND OF THE INVENTION

Technical Field

The invention relates to data transmission. More particularly, the invention relates to channel bandwidth estimating methods on hybrid technology wireless links.

Description of the Prior Art

Peak and sustainable data rates achievable in mobile broadband radio access networks have evolved by three orders of magnitude over the last decade. In many cases, three generations of radio technologies co-exist in the same geography, presenting data rates from few kbps to few hundred kbps to few mbps, all supported by same mobile device and same radio access network.

In addition to static attributes that differentiate three generations of radio access technologies, such as fundamental channelization characteristics of radio interfaces, dynamic variations introduced by multi-user loading and changing propagation conditions can make the per-user perceived bandwidth vary substantially very quickly.

These dynamic variations pose challenges to any application that relies on accurate channel estimation for bandwidth and data rate calculations, particularly if the task needs to be performed at the TCP/IP level. Accurate bandwidth and data rate calculations are needed for such scenarios as streaming video, voice over IP (VOIP), quality of service (QoS) enforcement, network characterization, network tuning, load estimation, and network optimization.

Prior art approaches to bandwidth estimation include such techniques as straight averaging, in which a determination is made of bytes received over a particular time interval. Such approaches use packet trains, where an a priori known packet sequence is sent, i.e. both the sender and the receiver know about this packet sequence. One disadvantage of sending a priori packet trains is that such technique is fundamentally disruptive to the network because it takes time to make the measurement, i.e. it does not provide a real-time value of available bandwidth, and because it adds overhead to network bandwidth by consuming such bandwidth during packet train network transit time.

It would be advantageous to provide a solution to the problem of accurately estimating channel bandwidth.

SUMMARY OF THE INVENTION

An embodiment of the invention provides a bandwidth estimation algorithm. A primary objective of the algorithm is to detect peak and/or average per-user bandwidth of data communication networks, such as narrowband and broadband wide-area radio access networks. The estimation can be performed at the TCP/IP layer with no lower layer (PHY, MAC, etc.) information assumed to be available. However, the bandwidth estimation algorithm can be applied to anywhere bandwidth needs to be estimated as well, such as DSL, cable networks, or satellite systems.

In particular, a bandwidth estimation algorithm on shared links detects peaks and/or average per-user bandwidth. Estimating is performed at the transport or IP layer with no assistance from lower layer (PHY, MAC, etc.) and the techniques can be used for any of adjusting the level of video optimization to the available bandwidth; driving QoS decisions at the transmitter based on available bandwidth; improving QoS enforcement during transitions among hybrid technologies on a wireless links; and correcting estimates on devices delivering bursty payload.

DETAILED DESCRIPTION OF THE INVENTION

Figure 1:
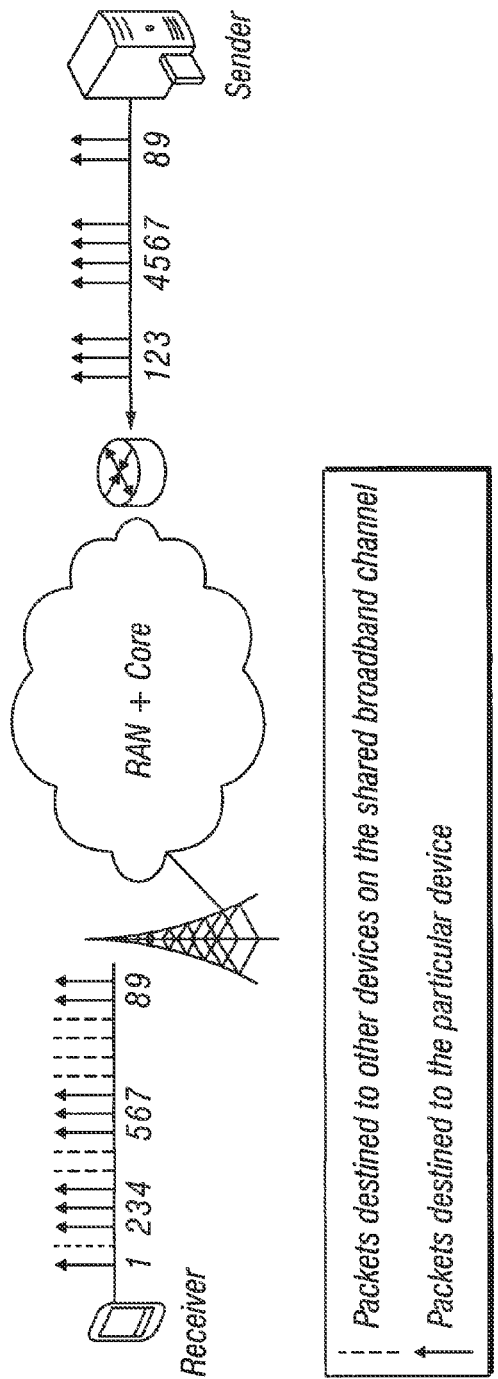
FIG. 1 illustrates the phenomena of dynamic variations in the inter-packet arrival times.
Figure 2:
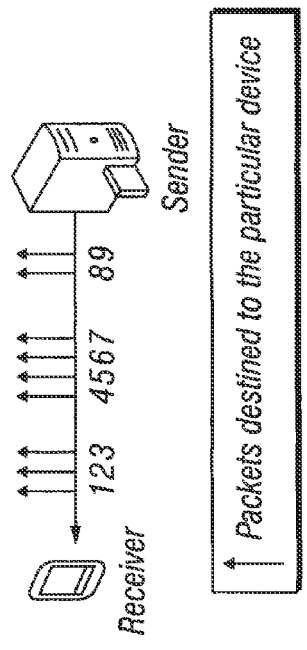
FIG. 2 shows that dynamic packet variations can happen in any scenario in which the sender needs to send packets to a receiver.

FIG. 1 illustrates the phenomena of dynamic variations in the inter-packet arrival times. As can be seen from FIG. 1, the packet arrival pattern and the packet sender pattern are not always correlated. In particular, in the EVDO family and the HSPA family, the most dominant mobile broadband networks today, the users share a 'big fat pipe' model, or a 'large shared channel' model, of a radio channel in time-divided manner, as opposed to dedicated radio channels for each user. The architecture shown in FIG. 1 is typical of the environment in which the invention here disclosed may be practiced and those skilled in the art will appreciate both how to implement such an environment and the many variations available in constructing such an environment. For example, while FIGS. 1 and 2 show an architecture in which unidirectional bandwidth estimation may be made from a server to a client (or from a client to a server), those skilled in the art will appreciate that the invention is applicable to bandwidth estimation bidirectionally as well, e.g. from a client to a server and from a server to a client.

FIG. 1 illustrates the usage scenario for sending packets through a radio access network. However, dynamic packet variations can happen in any scenario in which the sender needs to send packets to a receiver, as illustrated in the FIG. 2.

A common approach toward bandwidth estimation taken by many applications and algorithms involves accumulating received bytes over time, using some pre-determined criteria, and deriving the perceived bandwidth. This approach works well when the radio channel is dedicated or semi-dedicated. Examples of such radio access network (RAN)

technologies include 1xRTT, GRPS, and EDGE. However, when such solutions are applied in shared channel cases, as shown in FIG. 2, those calculations can yield incorrect estimations. Depending on specific criteria, such as accumulation period and packet types used for those calculations, these estimates can vary from being below the long-term temporal average to values above the peak instantaneous theoretical throughput. For example, if the instantaneous bandwidth is calculated by dividing the total number of bytes by the accumulation period, and if a number of packets arrive at the same time within a very short period, then the reported bandwidth can be inaccurately characterized as very high. This then has a detrimental impact on such things as the TCP layer send window and the QoS enforcement policy.

In the invention presented here, these drawbacks are avoided. A key contribution of the invention is the ability to detect a burst of packets delivered to a client device by the radio channel and to use that burst to calculate a bandwidth estimate sample. Several such samples are then used to compute a filtered average, which then becomes the reportable bandwidth estimate. A key assumption for this algorithm is that the algorithm is operating in the TCP/IP layer, either in application (user) space or kernel space, and that the underlying radio modem drivers delivers packets in a temporally correlated pattern relative to that of the actual arrival of constituent payload over the radio interface. Those skilled in the art will appreciate that many variations on this approach are possible within the confines of the invention herein.

Algorithm

Figure 3:
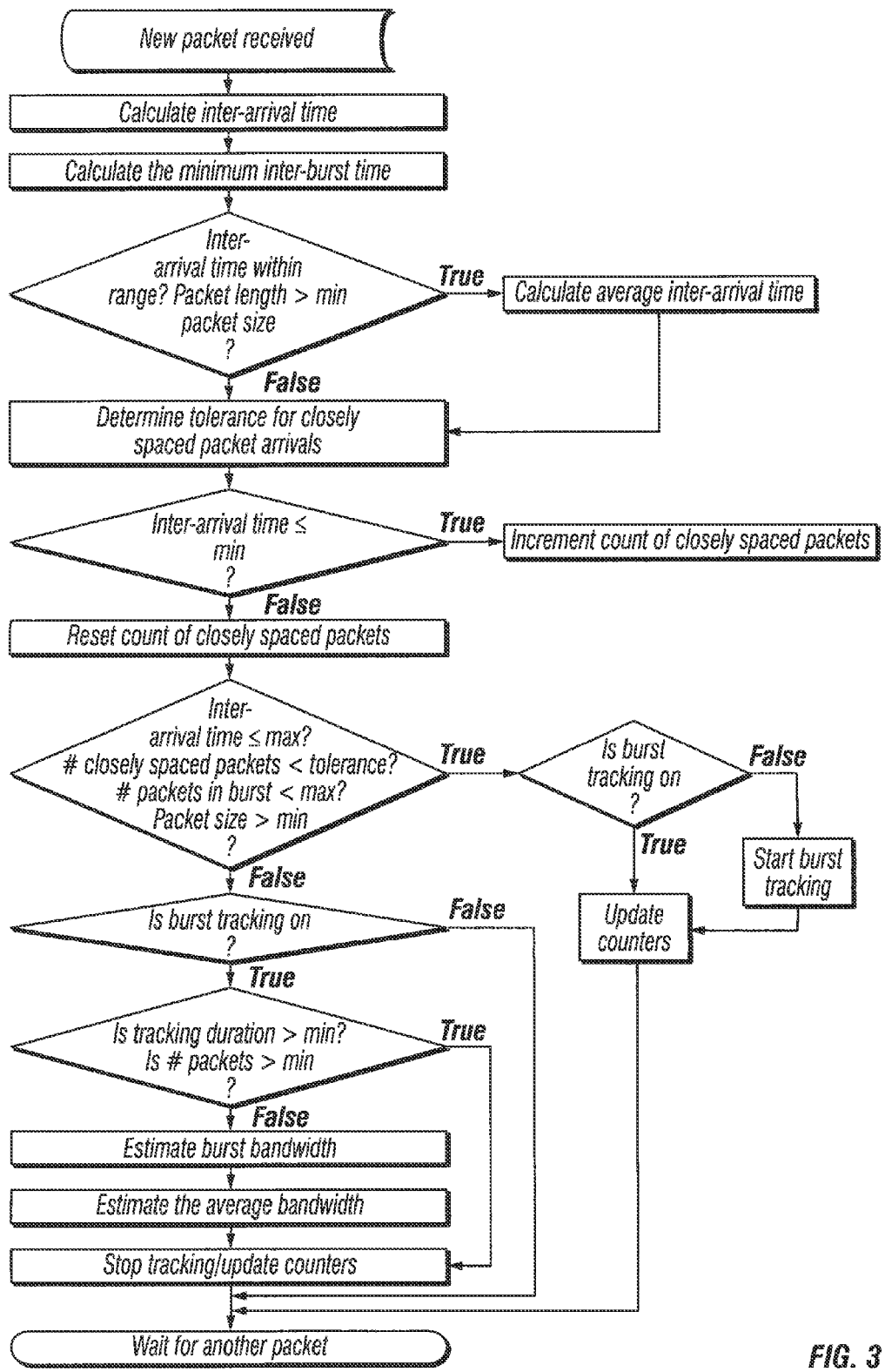
FIG. 3 is a flow chart that describes the general flow of the logic in a channel bandwidth estimation mechanism according to the invention.

FIG. 3 is a flow chart that describes the general flow of the logic of the channel bandwidth estimation algorithm according to a presently preferred embodiment of the invention. An embodiment of the algorithm goes through the following steps for every packet that is received, as denoted in FIG. 3:

1. A new packet is received. The timestamp of the packet is noted.

2. Calculate the inter-arrival time, which is the elapsed time between the timestamp noted for a previously received packet and the current packet.

3. Calculate the minimum inter-burst time, which must be re-calculated for every packet that arrives. Inter-burst time is defined as the time between bursts of packets, and the minimum inter-burst is the time that is used to determine if the inter-arrival time between packets is sufficiently long to determine two respective packets are not part of the same burst but are related to separate bursts for the purpose of bandwidth estimation.

The calculation of the minimum inter-burst time is a function of the current average of packet inter-arrival times, the average number of packets in a burst at the sender, and a pair of configurable rails (a set of configurable parameters) for maximum and minimum values.

In one embodiment of the invention, for purposes of calculating the minimum inter-burst time, the minimum inter-burst time is directly proportional to the average inter-arrival time. In another implementation of this function, the minimum inter-burst time is three times the average inter-arrival time. Other approaches may be used as well, as will be appreciated by the skilled person when practicing the herein disclosed invention.

The minimum inter-burst time is useful for detecting different bursts, as well as for adapting to changing channel conditions and in particular different radio interfaces. For example, HSDPA typically has 50-100 ms inter-burst time and 1-5 ms inter-arrival time, while 1xRTT typically has 150 ms inter-burst time and 60-80 ms inter-arrival time. By using the inter-arrival of the packets, which can be measured, and calculating the minimum inter-burst time in this way, the algorithm can automatically adapt to the use of HSDPA or 1xRTT in a hands-off approach without having to specify the network in use and without having to manually set parameters.

4. Check the inter-arrival time to see if it is greater than a minimum configurable value and less than a configurable upper limit, and also check to see if the packet length is greater than a configurable minimum packet size. If all conditions are satisfied, then go to step 5. Otherwise, skip step 5 and go to step 6.

5. Calculate the average packet inter-arrival time. The calculation of the average packet inter-arrival time can be a moving average and/or a weighted average.

6. Determine how many back-to-back, closely spaced packet arrivals the algorithm should be able to tolerate. Two packets are considered closely spaced if their inter-arrival time falls below a configurable minimum inter-arrival time.

High-speed network packets arrive on the order of few tens of milliseconds on average, which justifies occasional back-to-back zero ms inter-arrivals. Therefore, the algorithm tolerates a number of back-to-back closely spaced packet arrivals. However, due to the nature of underlying OS and device drivers, packets are not always delivered with the same relative inter-arrival pattern as that of their actual arrival patterns over the air interface. For this reason, an upper bound is set on the tolerable number of closely spaced packet arrivals within a packet burst. However, narrowband networks are in the several tens of milliseconds to the few hundred milliseconds range. Therefore, the algorithm is adaptive and can recalculate this upper bound every time a packet arrives.

7. Check to see if the inter-arrival time is less than a configurable minimum. If it is, the packet is closely spaced; go to step 8. Otherwise, go to step 9.

8. Adjust the count of closely spaced packets. Go to step 10.

9. Reset the count of closely spaced packets. Go to step 10.

10. Check the following for criteria, all of which have to be true for the current packet to be part of a packet burst for use in the bandwidth calculation:

The inter-arrival time is less than the minimum inter-burst time calculated in Step 3.

The number of back-to-back closely spaced packets counted in steps 7 through 9 is less than the tolerable number computed in Step 6.

The number of packets accumulated in the current burst is less than a configured maximum.

The size of this packet is greater than a configured minimum. Techniques, such as multiplexing data entry from multiple application layer connections served through a gateway server, may be applied to create packet sizes greater than a configured minimum. Multiplexing of data can thus lead to better bandwidth estimates without having to discard a significant number of samples.

If all these conditions are true, then go to step 11. Otherwise, go to step 14.

11. Check to see if burst tracking is currently on. If tracking is on, go to step 13. Otherwise, go to step 12.

12. Start burst tracking. Go to step 13.

13. Update burst tracking counters. Go to step 19.

14. Check to see if burst tracking is currently on. If tracking is on, go to step 15. Otherwise, go to step 19.

15. Check to see if the tracking duration, i.e. the elapsed time between the first and last packet of the burst, is greater than a configurable minimum tracking duration, and the number of packets within the burst is greater than a configurable minimum number of packets. If both conditions are true, go to step 18. Otherwise go to step 16.

16. Estimate the bandwidth for this burst by dividing the number of accumulated bytes by the tracking duration. The bandwidth value is checked whether it falls within the minimum and maximum bandwidth values. This sample is added to a running set of previous samples. The running set is of configurable length.

17. Estimate the average reportable bandwidth value, from the running set of previous bandwidth samples. The average can be a weighted average, with fixed coefficients or variable coefficients.

18. Stop burst tracking. Update the appropriate counters.

19. Wait for another packet to arrive.

Configuration

A presently preferred embodiment of the herein disclosed bandwidth estimation algorithm introduces the following configuration parameters. These attributes are parameterized to give flexibility to fine-tune the system into an optimal operating point that is robust across a variety of radio access networks and loading conditions. Those skilled in the art will appreciate that some or all of these parameters may comprise part of an implementation of the invention, that the designation given these parameters is arbitrary, that the default values are not mandatory (hence, the fact that they are configurable) and that other parameters not described below may be used in connection with the invention as well.

bw4_min_iat

This configurable parameter specifies a minimum threshold for the inter-arrival time between two consecutive packets. The purpose of this parameter is to detect closely spaced inter-arrival times between consecutive packets resulting from client side context switching.

Default value: 0 ms bw4_min_iat_count

This configurable parameter specifies an upper limit for the number of consecutive packets that have inter-arrival times less than or equal to bw4_min_iat. If the upper limit is reached, the most recently arrived packet stops the packet burst tracking process.

Default value: 1 (allows two consecutive packets of bw4_min_iat time between them).

bw4_max_iat

This configurable parameter specifies the maximum threshold for inter-arrival time between two consecutive packets. The purpose is to detect long inter-arrival time resulting from "no sending time," e.g. a web-browsing user clicks a link and waits for two minutes before clicking another link.

Default value: 100 ms bw4_max_pkts

This configurable parameter specifies the maximum number of valid packets after which the current packet trace is stopped for calculating bandwidth, and a new trace is potentially started.

Default value: 10 bw4_min_pkts

This configurable parameter specifies the minimum number of valid packets needed in a packet trace for a valid bandwidth calculation. If this minimum is met, when other criteria/conditions flag an end to a packet trace, a bandwidth calculation is made on that packet trace.

Default value: 3 bw4_min_pkt_size

This configurable parameter specifies the minimum number of bytes needed inside a packet to qualify that packet as a valid packet for bandwidth estimation purpose. The purpose is to use only packets of reasonable size for bandwidth calculation.

Default value: 512 bytes

Applications

The output of the above-described algorithm is a metric that is useful for many purposes. Thus, the estimated value can be fed into various entities on the sender side, among others, for example to identify the transmit rate to apply. The metric can also be used for various other applications such as, for example, load estimation. In a presently preferred embodiment of the invention, the metric is used to provide a transmit rate value. The metric may also be used, for example, for video content optimization, for example it may be used as a parameter that dynamically alters compression levels and image quality, based upon bandwidth.

The metric may be collected and stored as historical information and used to prepare reports that a system manager can review to understand bandwidth use patterns in a network. Thus, the metric produced by the invention is useful for reporting such things, for example, as traffic usage patterns, instantaneous values, trends over time, hot times of day, hot times of week, if there was a failure in the system, the effect a failure had on the system, and other diagnostic information. For the purpose of delivering prioritized traffic over a single connection to/from the user device, traffic may be separated into multiple parallel channels. The channel estimation techniques described herein can be applied in connection with link bandwidth sharing.

The metric can also be used in connection with throttling, i.e. setting up thresholds for different application flows, and for enhancing quality of service (QoS) across different application flows. The metric can also be used for setting a priority for a particular application or to find the bandwidth available for a particular user who is in a particular sector.

In connection with load estimation, the load considered need not be the entire mobile network. The invention may be used to localize the load to a particular antenna, for example. That gives great advantage to the application, because however the bandwidth information is used, it is not necessarily for the entire network, e.g. it can be for an individual user. Further, for load estimation there are various levels of granularity from atomic, which would be the individual user, to system-wide.

The metric also allows an operator to troubleshoot the network. For example, an operator can measure the bandwidth for a five-minute period, or send packets for five minutes, and then measure how much is actually sent to determine the bandwidth. However, there may be some interval of time in between where the conditions over the network are changing. This change is captured in real-time, using the metric developed using the invention herein, at a granular interval that tells an operator what happened between these five minutes.

The invention allows for operator adjustable parameters, such as optimization levels based on various bandwidth conditions. Typically, the end-user or consumer end-user has no direct visibility into these parameters. For example, in connection with a video optimization product the operator may notice that available bandwidth is 200 kilobits per second. In this example, the operator has the option to set parameters which, in effect, tell the system "If you see available bandwidth is 200 kilobits per second, set the video rate to be this level." Thus, the operator can define, for example, low, medium, and high levels of bandwidth use. The user, on the other hand, may then have the option to select low, medium, or high, but low, medium, and high are dynamically changed based on the available bandwidth that the server determines is the available bandwidth. Therefore, the meaning of low, medium, and high to the user is dynamically adjusted in response to bandwidth estimation and, optionally, based upon operator determined thresholds.

Those skilled in the art will appreciate that the invention is applicable to all wireless technologies, starting from 2G, 2.5G, 3G, 4G, variations such CDMA, WCDMA, Edge technology, HSPA, and even non-wireless mediums. Thus, the invention may be used in connection with bandwidth estimation on any shared medium, e.g. cable bandwidth estimation. For example, in transitioning from one technology to another, e.g. from Edge to 3G, bandwidth needs change, and the algorithm herein likewise adapts to such changing bandwidth in those conditions.

Computer Implementation

Figure 4:
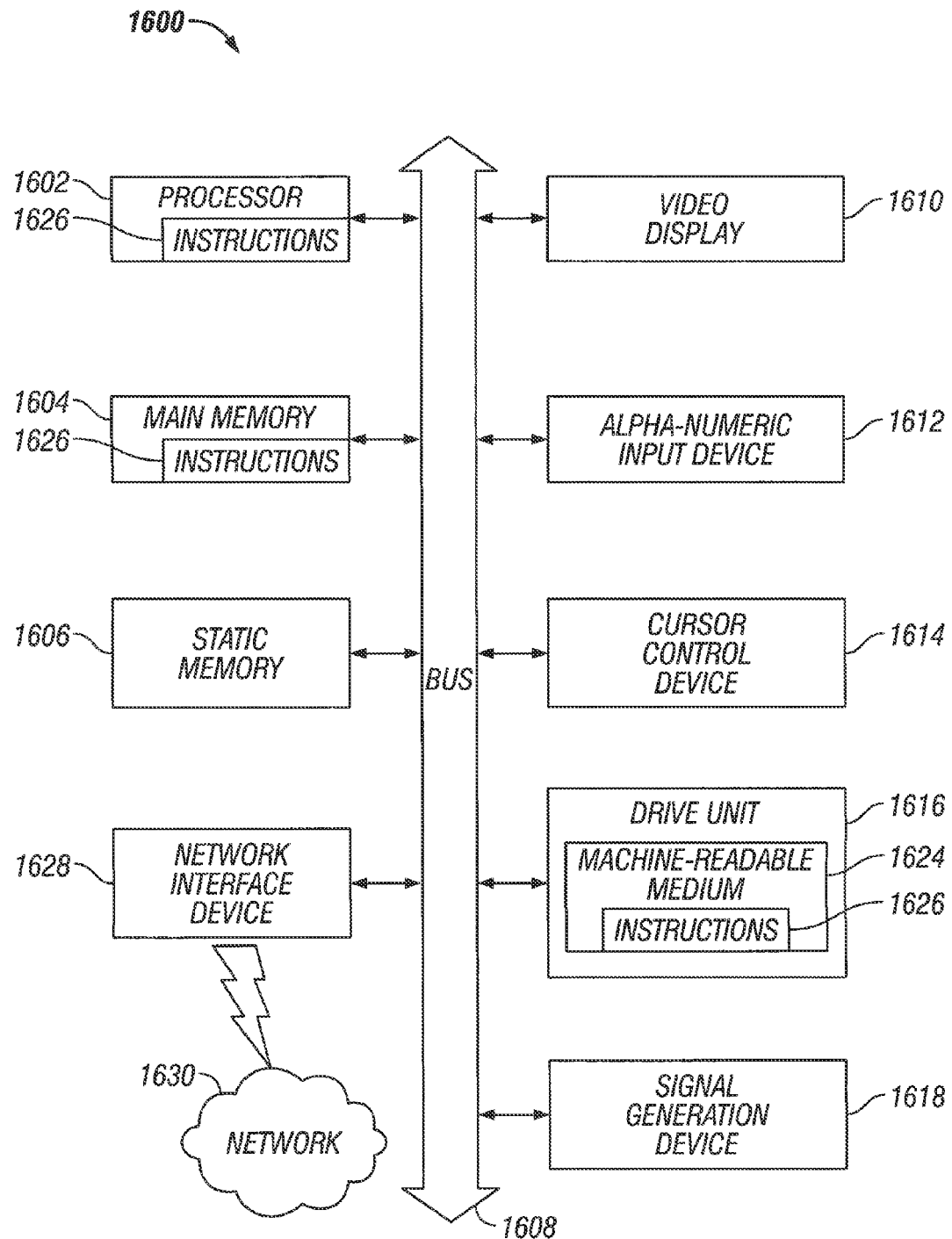
FIG. 4 is a block schematic diagram of a machine in the exemplary form of a computer system within which a set of instructions may be programmed to cause the machine to execute the logic steps of FIG. 3 according to the invention.

FIG. 4 is a block schematic diagram of a machine in the exemplary form of a computer system 1600 within which a set of instructions may be programmed to cause the machine to execute the logic steps of FIG. 3 according to the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. Those skilled in the art will appreciate that the processor may comprise one or more individual processors which may be situated in the same location or in disparate locations. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Challenges

As network speeds reach another order of magnitude (approaching 10 Mbps), measuring bandwidth accurately using inter-packet arrival time becomes challenging. Primarily, this has to do with device operating systems delivering packets with zero-millisecond clusters. Microsecond accuracy is needed to measure speeds at this rate. Another emerging issue is the OFDM based RANs that are likely to exhibit less bursty' patterns and more 'smoothed' pattern of packet arrivals. The invention is considered sufficiently robust to meet each and every one of these challenges.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for channel bandwidth estimation, comprising the steps of:

receiving a packet at a receiver and noting a timestamp of the packet;

calculating an inter-arrival time comprising the elapsed time between the timestamp noted for a previously received packet and the received packet;

if the inter-arrival time is less than a configurable minimum and the packet is therefore closely spaced, adjusting a counter of closely spaced packets, else resetting the counter of closely spaced packets;

checking for the following criteria, all of which have to be true for a current packet to be part of a packet burst for use in bandwidth calculation:

the number of back-to-back, closely spaced packets counted is less than a determined tolerable number of back-to-back, closely spaced packet arrivals;

the number of packets accumulated in a current burst is less than a configured maximum; and the size of the current packet is greater than a configured minimum;

if all the foregoing criteria are true, then determining if burst tracking is currently on, wherein if tracking is on, updating a burst tracking counter and waiting for another packet to arrive; else starting burst tracking, updating said burst tracking counter and waiting for another packet to arrive; and if not all the foregoing conditions are true, checking to see if burst tracking is currently on wherein:

if tracking is on, and if tracking duration, comprising the elapsed time between a first and last packet of the burst, is greater than a configurable minimum tracking duration, and if the number of packets within the burst is greater than a configurable minimum number of packets, then stopping burst tracking and updating said counters as appropriate;

else estimating bandwidth for the burst by dividing a number of accumulated bytes by tracking duration and checking whether bandwidth value falls within minimum and maximum bandwidth values; and if tracking is not on, waiting for another packet to arrive.

2. The method of claim 1, comprising:
applying said bandwidth estimating to recognize a level of sharing on bandwidth limited links to improve QoS enforcement policy.

3. The method of claim 1, comprising:
applying said bandwidth estimating to recognize transitions from one underlying radio technology to another applied to improve QoS enforcement policy.

4. The method of claim 1, comprising:
applying said bandwidth estimating to derive a level of optimization for video content.

5. The method of claim 4, comprising:
applying said bandwidth estimating to allow selection for delivery of any of high, medium, and low quality video streams to an end user based upon bandwidth conditions on a radio link.

6. The method of claim 1, further comprising:
correcting channel bandwidth estimation on a device with a driver delivering zero-millisecond packet clusters.

7. The method of claim 1, comprising:
applying said bandwidth estimating to accommodate both bursty and smooth arrival patterns.

8. The method of claim 7, comprising:
applying said bandwidth estimating to accommodate a radio network that contains an OFDM link.

9. An apparatus for channel bandwidth estimation, comprising:
receiver for receiving a packet and noting a timestamp of the packet;
a processor for calculating an inter-arrival time comprising the elapsed time between the timestamp noted for a previously received packet and the received packet;
said processor configured to:
adjust a counter of closely spaced packets if the inter-arrival time is less than a configurable minimum and the packet is therefore closely spaced, else resetting the counter of closely spaced packets;
check for the following criteria, all of which have to be true for a current packet to be part of a packet burst for use in bandwidth calculation:
the number of back-to-back, closely spaced packets counted is less than a determined tolerable number of back-to-back, closely spaced packet arrivals;
the number of packets accumulated in a current burst is less than a configured maximum;
the size of the current packet is greater than a configured minimum;
determine if burst tracking is currently on if all the foregoing criteria are true, then if tracking is on, update a burst tracking counter and wait for another packet to arrive; else start burst tracking, update said burst tracking counter and wait for another packet to arrive; and
if not all the foregoing conditions are true, check to see if burst tracking is currently on wherein:
if tracking is on, and
if tracking duration, comprising the elapsed time between a first and last packet of the burst, is greater than a configurable minimum tracking duration, and if the number of packets within the burst is greater than a configurable minimum number of packets, then stop burst tracking and updating said counters as appropriate;
else estimate bandwidth for a burst by dividing a number of accumulated bytes by tracking duration and checking whether bandwidth value falls within minimum and maximum bandwidth values; and
if tracking is not on, wait for another packet to arrive.

10. The apparatus of claim 9, wherein said processor is configured for applying said bandwidth estimating to recognize a level of sharing on bandwidth limited links to improve QoS enforcement policy.

11. The apparatus of claim 9, wherein said processor is configured for applying said bandwidth estimating to recognize transitions from one underlying radio technology to another applied to improve QoS enforcement policy.

12. The apparatus of claim 9, wherein said processor is configured for applying said bandwidth estimating to derive a level of optimization video content.

13. The apparatus of claim 12, wherein said processor is configured for applying said bandwidth estimating to allow selection for delivery of any of high, medium, and low quality video streams to an end user based upon bandwidth conditions on a radio link.

14. The apparatus of claim 9, wherein said processor is configured for correcting channel bandwidth estimation on a device with a driver delivering zero-millisecond packet clusters.

15. The apparatus of claim 9, wherein said processor is configured for applying said bandwidth estimating to accommodate both bursty and smooth arrival patterns.

16. The apparatus of claim 15, wherein said processor is configured for applying said bandwidth estimating to accommodate a radio network that contains an OFDM link.

* * * * *